United States Patent
Zhou et al.

(10) Patent No.: US 11,566,606 B2
(45) Date of Patent: Jan. 31, 2023

(54) METHOD FOR QUICKLY PREDICTING FATIGUE LIFE OF WRINKLE DEFECT-CONTAINING MAIN SPAR IN WIND TURBINE BLADE

(71) Applicant: Shenyang University of Technology, Shenyang (CN)

(72) Inventors: Bo Zhou, Shenyang (CN); Fang'ai Yu, Shenyang (CN)

(73) Assignee: SHENYANG UNIVERSITY OF TECHNOLOGY, Shenyang (CN)

( * ) Notice: Subject to any disclaimer, the term of this patent is extended or adjusted under 35 U.S.C. 154(b) by 0 days.

(21) Appl. No.: 17/544,607

(22) Filed: Dec. 7, 2021

(65) Prior Publication Data
US 2022/0195991 A1 Jun. 23, 2022

(30) Foreign Application Priority Data
Dec. 22, 2020 (CN) .......................... 202011527291.1

(51) Int. Cl.
*F03D 17/00* (2016.01)
*G01N 3/32* (2006.01)

(52) U.S. Cl.
CPC .............. *F03D 17/00* (2016.05); *G01N 3/32* (2013.01); *F05B 2240/30* (2013.01); *F05B 2260/821* (2013.01); *F05B 2260/83* (2013.01); *F05B 2260/84* (2013.01)

(58) Field of Classification Search
CPC .. F03D 17/00; G01N 3/32; G01N 2203/0005; F05B 2260/821; F05B 2260/83; F05B 2260/84; F05B 2270/332; G01M 5/0016
See application file for complete search history.

(56) References Cited

U.S. PATENT DOCUMENTS

2020/0331216 A1* 10/2020 Burnett .................... G01N 3/08

OTHER PUBLICATIONS

Reifsnider, K. Determination of Fatigue-related Heat Emission in Composite Materials. Experimantal Mechanics (1974). pp. 479-485 (Year: 1974).*

(Continued)

*Primary Examiner* — Topaz L. Elliott
(74) *Attorney, Agent, or Firm* — Onello & Mello, LLP

(57) ABSTRACT

A method for quickly predicting a fatigue life of a wrinkle defect-containing main spar in a wind turbine blade is provided. The method includes: S1: testing a tensile property of a wrinkle defect-containing main spar to be tested; S2: calculating, according to surface temperature data of the specimen obtained in step S1, intrinsic dissipated energy of the main spar specimen under different loading stresses; S3: plotting a relational graph between intrinsic dissipated energy of the specimen and a corresponding ultimate tensile strength (UTS) level; S4: establishing, based on a change of the intrinsic dissipated energy in a fatigue process, a normalized residual stiffness model containing parameters to be determined, and putting fatigue test data into the model; S5: deducing a fatigue life prediction model for the wrinkle defect-containing main spar specimen according to the normalized residual stiffness model with determined parameters; and S6: obtaining a normalized failure stiffness.

8 Claims, 5 Drawing Sheets

(56) References Cited

OTHER PUBLICATIONS

La Rosa, G. and A. Risitano. Thermographic methodology for the rapid determination of fatigue limit of materials and mechanical components. Int J Fatigue, 22 (1) (2000), pp. 65-73. (Year: 2000).*
G. Fargione, A. Geraci, G. La Rosa, A. Risitano. Rapid determination of the fatigue curve by the thermographic method. Int J Fatigue, 24 (1) (2002), pp. 11-19 (Year: 2002).*
Giancane, S. Characterization of fatigue damage in long fiber epoxy composite laminates. International Journal of Fatigue. vol. 32, Issue 1, Jan. 2010, pp. 46-53. DOI: 10.1016/j.ijfatigue.2009.02.024 (Year: 2010).*
Shah, O. Investigation of self heating and damage progression in a polyester fiberglass composite under tensiontension cyclic loading. ECCM 16, Seville, Spain. Jun. 22-26, 2014. (Year: 2014).*
Parareda, S. Fatigue resistance evaluation of high Mn-TWIP steel through damage mechanics: A new method based on stiffness evolution. International Journal of Fatigue 156(2022):106643. DOI: 10.1016/j.ijfatigue.2021.106643 (Year: 2022).*

\* cited by examiner

METHOD FOR QUICKLY PREDICTING FATIGUE LIFE OF WRINKLE DEFECT-CONTAINING MAIN SPAR IN WIND TURBINE BLADE

CROSS REFERENCE TO RELATED APPLICATION

This patent application claims the benefit and priority of Chinese Patent Application No. 202011527291.1 filed on Dec. 22, 2020, the disclosure of which is incorporated by reference herein in its entirety as part of the present application.

TECHNICAL FIELD

The present disclosure relates to a technical field of a fatigue life prediction of wind turbine blades and methods for predicting fatigue lives of other resin matrix composites, and in particular, to a method for quickly predicting the fatigue life of a wrinkle defect-containing main spar in a wind turbine blade.

BACKGROUND ART

Among green and clean renewable energy sources with relatively low development and utilization costs, wind energy has become a new energy source with the most commercial potential and promising development in China. Wind energy is mainly utilized by converting wind into electricity through a wind turbine. The wind turbine is considered as a typical electro-mechanical integration system, in which a blade is the most important component for receiving the wind energy, accounting for about 15-20% in total cost of the wind turbine. However, the blade works against a severe environment and complicated alternating loads for a long time, and its fatigue damage under an operational condition is accumulated progressively to pose a great hazard and threat to a safe operation of a wind farm. To ensure a 20-year service life of a wind turbine blade under fatigue loading, an effective evaluation on a fatigue property of the blade is of great significance for improving reliability and economy and avoiding catastrophic accidents from a failure of the blade.

At present, glass fiber reinforced polymer (GFRP) with glass fiber as reinforcing material and resin as a matrix is usually used to fabricate the wind turbine blades. A main spar is a main load-carrying structure of the blade and a main section leading to a blade fracture. Most main spars use unidirectional GFRP laminates as main structures, and 0° glass fibers as overlays. In the wind energy industry, the wrinkle defect in the main spar, regarded as a kind of defect that frequently occurs, is difficult to prevent and detect during fabrication, and may lead to sudden failures. Under the action of the alternating loads, the fatigue damage of a defective main spar is accumulated quickly so as to shorten the service life of the blade. There are many related studies at present to predict the fatigue life of non-defective composites, but these studying results are unsuitable for predicting the fatigue life of the defective composites. Therefore, it is essential to develop a model capable of accurately predicting the fatigue life of a wrinkle defect-containing main spar. If it is detected that a main spar does not meet the service life, the blade may be replaced or maintained in a planned way in advance to effectively reduce the operation and maintenance cost of the blade.

It is the common practice in fatigue test to evaluate the fatigue property of the main spar by testing a number of specimens under different loads, and recording and counting fatigue lives of the specimens under the different loads. However, the conventional test methods have a series of deficiencies such as long test period, large consumption of the specimens, and scattered data. Since the fatigue damage of the material is an energy dissipation process varying with a temperature, a series of methods for analyzing and testing fatigue properties of composites based on energy dissipation of specimens under fatigue loads have been proposed in recent years, which are called energy methods. As a common non-destructive temperature test method, infrared thermography has been used to establish a fatigue life prediction model in terms of energy. Compared with the conventional test methods, the energy methods shorten the test period and reduce the number of specimens to a great extent, and they are quick, economical and accurate fatigue life prediction technologies.

Models with energy dissipation as a fatigue damage indicator reflect external forms of the composites during the process of fatigue failure substantively, without taking account of changes in physical properties of the fatigues. In addition to the macroscopic change of energy dissipation, the fatigue process of the composite further leads to changes of the strength, stiffness, Poisson's ratio, damping coefficient and other physical properties of the material. Most of the current damage accumulation models are phenomenological that consider the effect of energy or stiffness degradation. However, existing life prediction models only consider the damage indicator of one factor, rather than establishing a relation between fatigue degradation and the change of a macroscopically measurable energy dissipation for the material. If advantages of two or more factors are considered overall, a comprehensive and accurate model for predicting the fatigue life of the wrinkle defect-containing main spar specimen may be established, which is valuable to engineering applications.

SUMMARY

In view of defects of the conventional art, the present disclosure provides a method for quickly predicting a fatigue life of a wrinkle defect-containing main spar in a wind turbine blade. The present disclosure analyzes the influence of an internal defect of the main spar on the fatigue life during life prediction, fully considers the complicated change of the external intrinsic energy dissipation and the residual stiffness in the fatigue process of the main spar specimen, and may predict the fatigue life accurately and quickly in a short time. The prediction method of the present disclosure is closer to a test and actual condition, with a more scientific and accurate predicted result.

To achieve the above objectives, the present disclosure uses the following technical solutions, including following steps:

step S1: testing, on a universal fatigue testing machine, a tensile property of a wrinkle defect-containing main spar specimen to be tested, to obtain an ultimate tensile strength (UTS); and synchronously monitoring and recording a temperature change on a surface of the specimen with an infrared thermal imager during a fatigue test, and counting and recording surface temperature, stress, strain and stiffness data of the specimen under different numbers of cycles upon completion of the test;

step S2: calculating, according to the surface temperature data of the specimen obtained in step S1, intrinsic dissipated energy of the main spar specimen under different loading stresses in a temperature stabilizing stage;

step S3: plotting a relational graph between intrinsic dissipated energy $d_{ista}$ of the specimen and a corresponding UTS level, performing interpolation with two curve method on data trendlines having two different slopes in the relational graph, and determining a fatigue limit of the specimen according to a $\sigma_{max}$ coordinate value of an intersection of two straight lines, where an area with a load above the fatigue limit is considered as an overloaded area, which is an area where a failure of the specimen occurs; and there is no failure of the specimen in an area with a load below the fatigue limit during the test;

step S4: establishing, based on a change of intrinsic dissipated energy in a fatigue process, a normalized residual stiffness model containing parameters to be determined, and putting fatigue test data recorded in steps S1 and S2 into the model to determine values of unknown parameters a, b, p and q in the model, where a and b are parameters related to a wrinkle defect in a material; and p and q are two material parameters independent of the intrinsic dissipated energy and a loading cycle;

step S5: deducing a fatigue life prediction model for the wrinkle defect-containing main spar specimen according to the normalized residual stiffness model with the determined parameters; and step S6: defining a number of cycles under which the specimen may sustain a maximum fatigue load to determine a normalized failure stiffness; and predicting, through the fatigue life prediction model with the determined normalized failure stiffness, the fatigue life of the specimen to be tested, in the overloaded area to obtain a predicted S-N curve of the wrinkle defect-containing main spar specimen.

In an embodiment, in step S1, a maximum loading stress of the fatigue test may be applied to the specimen at a step size of 5% in a range of 20%-90% of the UTS; and each time, the specimen may be only tested within 8,000 loading cycles.

In an embodiment, the universal fatigue testing machine in step S1 may be a MTS 810 hydraulic electromagnetic servo fatigue machine; the tensile property may be tested at a displacement rate of 2 mm/min; and the specimen is subjected to a constant tensile loading amplitude sinusoidal wave form with a frequency of 10 Hz and a stress ratio of 0.1.

In an embodiment, calculating the intrinsic dissipated energy of the main spar specimen in the temperature stabilizing stage in step S2 may include:

ignoring, when a uniform uniaxial cyclic load is applied to the main spar, an internal coupling source between an internal variable and a temperature; and implementing a balance between heat loss and the intrinsic dissipated energy when each cycle of the specimen is ended in the temperature stabilizing stage of the fatigue process, and expressing a model for calculating a stable intrinsic dissipated energy in the stage as:

$$d_{istab} = -\text{div}(k\text{grad}T_{stab}) \quad (1)$$

where, $T_{stab}$ is a temperature of the specimen in a surface temperature stabilizing stage in units of ° C., k is a thermal conductivity in units of W/(m·K), and div(kgradT$_{stab}$) is a heat loss rate arising from heat conduction.

In an embodiment, establishing the normalized residual stiffness model in step S4 may include:

step S41: expressing a fatigue damage indicator D(n) during the fatigue test with a residual stiffness under the fatigue load as:

$$D(n) = \frac{E_0 - E(n)}{E_0 - E_f} = \frac{1 - E'(n)}{1 - E'_f} \quad (2)$$

where, n is a number of cycles; E(n) is a stiffness corresponding to an nth cycle; $E_0$ is an initial effective stiffness along an x-axis direction; E'(n) is a normalized residual stiffness corresponding to the nth cycle, and is defined as E(n)/$E_0$; $E_f$ is a failure stiffness; and $E'_f$ is a normalized failure stiffness at a final cycle $N_f$, and is defined as $E_f/E_0$; and step S42: establishing a relational expression between a normalized residual stiffness E'(n) in a fatigue-loading x-axis direction and the number of cycles as follows by introducing an influence of a height-width ratio in the wrinkle defect, based on a fact that a certain relation is present between a stable intrinsic dissipated energy value $d_{istab}$ and a damage accumulation:

$$E'(n) = \frac{1}{a(A/L)^b + 1}(1 - pd_{istab}n^{1/q}) \quad (3)$$

where, A and L are respectively a height and a width of an out-of-plane wrinkle defect; a and b are the parameters related to the wrinkle defect in the material; p and q are two material parameters independent of the intrinsic dissipated energy and the loading cycle; the normalized residual stiffness E'(n) is dimensionless, p is denoted in units of (J·m$^{-3}$·s$^{-1}$)$^{-1}$ and a, b and q are defined as dimensionless parameters for keeping a dimension uniform; the parameters a and b are used to reflect an influence from a geometry of the wrinkle; the parameter q is used to control a shape of a function; and parameter p is used to regulate an influence of $d_{istab}$, considering that $d_{istab}$ in the fatigue process depends on a test material.

In an embodiment, establishing the fatigue life prediction model in step S5 may include:

step S51: expressing, in combination with the equation (2) and the equation (3), the fatigue damage indicator as:

$$D(n) = \frac{1 - \dfrac{1 - pd_{istab}n^{1/q}}{a(A/L)^b + 1}}{1 - E'_f} \quad (4)$$

step S52: implementing an effect that a damage accumulation indicator must be 1 in a case of the final cycle $N_f$ to failure, which is expressed as $D(N_f)=1$, and expressing the deduced fatigue life prediction model as:

$$N_f = \left\{\frac{1 - [a(A/L)^b + 1](1 - E'_f)}{pd_{istab}}\right\}^q \quad (5)$$

In an embodiment, a selected main spar to be tested in the wind turbine blade may be made of unidirectional glass fiber reinforced polymer (GFRP) material.

In an embodiment, a predicted fatigue life result may be obtained with a conventional fatigue test, or may also be estimated with the proposed life prediction model.

Compared with the conventional art, the present disclosure has the following beneficial effects:

The present disclosure provides the method for quickly predicting the fatigue life of the wrinkle defect-containing main spar in the wind turbine blade by introducing unknown parameters and establishing an intuitive relation between the damage variable and the macroscopic energy dissipation and residual stiffness in the fatigue process. Compared with the existing prediction method, the present disclosure has advantages of short test time, saving test costs, accurate test results, and so on, and is novel to predict the fatigue property of the defective main spar material. Meanwhile, the present disclosure has clear physical meanings, simple technologies, and convenience for engineering technicians in use, and provides references for fabrication, test and repair of the main spar material.

BRIEF DESCRIPTION OF THE DRAWINGS

The present disclosure will be further described below with reference to the drawings and specific embodiments. The protection scope of the present disclosure is not limited to the following descriptions.

In the drawings.

DETAILED DESCRIPTION OF THE EMBODIMENTS

In order to make the technical problems, technical solutions, and beneficial effects solved by the present disclosure clearer, the present disclosure will be further described below in detail with reference to the drawings and specific embodiments. It should be understood that the specific embodiments described herein are merely intended to explain rather than limit the present disclosure.

Figure 1:
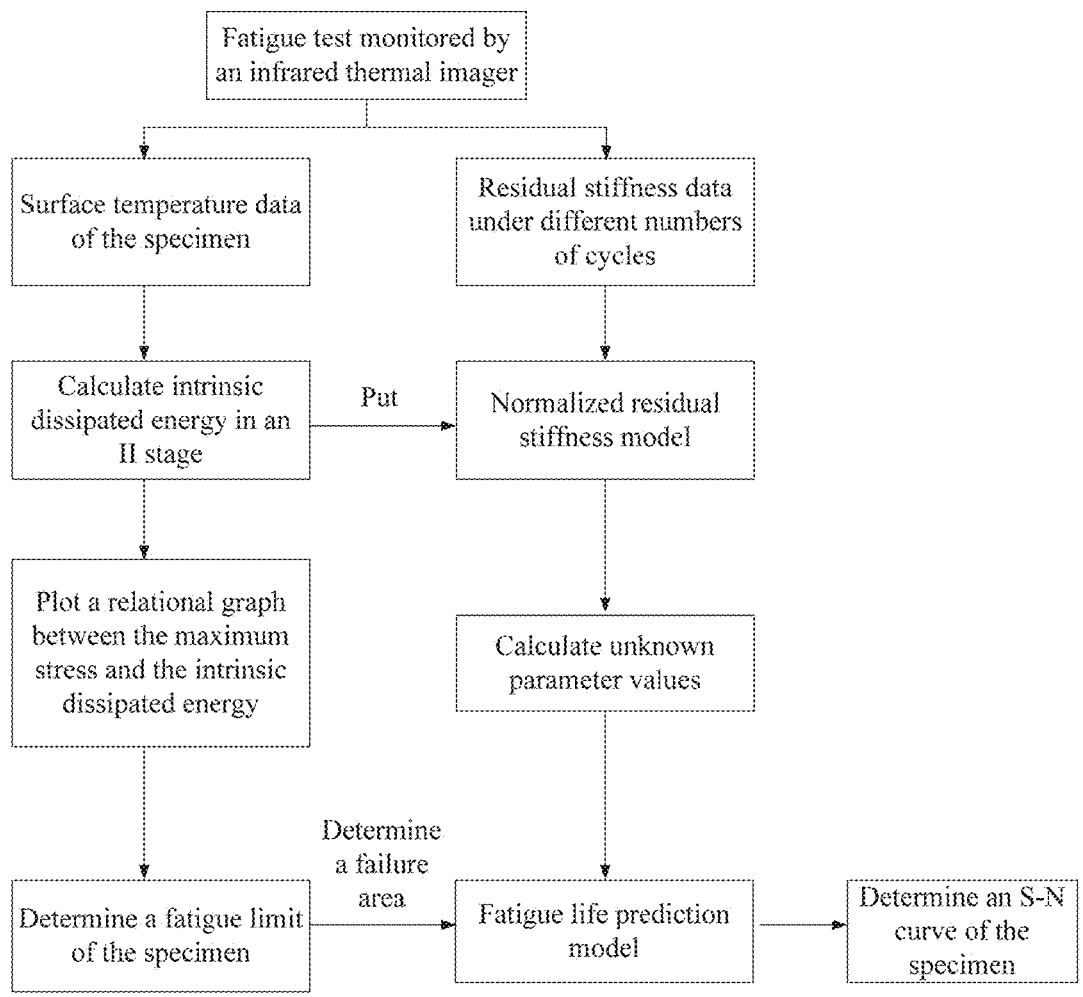
FIG. 1 shows a flow chart of an embodiment of a method for predicting a fatigue life according to the present disclosure.

FIG. 1 shows a flow chart of a method for predicting a fatigue life according to the present disclosure. The method includes steps 1-6.

In step 1, a wrinkle defect-containing main spar specimen is tested for tensile properties on a universal fatigue testing machine to obtain an ultimate tensile strength (UTS). A maximum loading stress of a fatigue test is applied to the specimen at a step size of 5% in a range of 20%-90% of the UTS, and each time, the specimen is tested only within 8,000 loading cycles. And a temperature change on a surface of the specimen is synchronously observed and recorded with an infrared thermal imager during the fatigue test to obtain test data related to a fatigue life.

In step 2, according to the surface temperature data of the specimen obtained in step S1, intrinsic dissipated energy of the main spar specimen in a temperature stabilizing stage under different loading stresses is calculated.

In step 3, a relational graph between intrinsic dissipated energy $d_{ista}$ of the specimen and a corresponding UTS level is plotted, interpolation is performed with two curve method on data trendlines having two different slopes in the relational graph, and a fatigue limit of the specimen is determined according to a $\sigma_{max}$ coordinate value of an intersection of two straight lines. An area with a load above the fatigue limit is considered as an overloaded area, namely, an area where a failure of the specimen occurs; and there is no failure of the specimen in an area with a load below the fatigue limit during the test.

In step 4, a normalized residual stiffness model containing parameters to be determined is established based on a change of intrinsic dissipated energy in a fatigue process. The fatigue test data recorded in steps 1 and 2 is put into the model to determine related parameter values in the model.

In step 5, for the wrinkle defect-containing main spar specimen, a fatigue life prediction model is deduced according to the normalized residual stiffness model with the determined parameters.

In step 6, the number of cycles under which the specimen may sustain a maximum fatigue load is defined as $10^6$ cycles to obtain a normalized failure stiffness. The fatigue life prediction of the specimen to be tested in the overloaded area is performed through the fatigue life prediction model with the determined normalized failure stiffness to obtain a predicted S-N curve of the wrinkle defect-containing main spar specimen.

In an embodiment, materials used by the specimen are selected from actual large blade fabrication companies, for example, the materials include the 1250 gsm glass fiber fabricated by the PPG-Devold and the 135 epoxy resin fabricated by the Hexion RIM. In the embodiment, a laminate specimen structurally identical with an actual main spar and including 10 unidirectional overlays is fabricated. The laminate specimen has a dimension of 255 mm (length)×30 mm (width)×10 mm (thickness). When the laminate specimen is fabricated, a cylindrical plastic rod is inserted into a center of a bottom fiber cloth before vacuum pumping, so as to introduce the wrinkle defect. The laminate specimen in the embodiment has a height-width ratio of 0.4 and contains the wrinkle defect in the center. Performance parameters of the glass fiber and the epoxy resin have been known from a supplier data sheet. Table 1 shows elastic parameters of these materials. Table 2 shows geometric features of the specimen.

TABLE 1

| | | | Elastic properties of the materials | | | | | |
|---|---|---|---|---|---|---|---|---|
| | $E_{11}$(Gpa) | $E_{22}$(Gpa) | $E_{33}$(Gpa) | $G_{12}$(Gpa) | $G_{13}$(Gpa) | $G_2$(Gpa) | $v_{12}$ | $v_{13}$ | $v_{23}$ |
| Glass fiber | 7.51 | 1.24 | 1.27 | 2.53 | 1.93 | 1.4 | 0.24 | 0.34 | 0.26 |
| Epoxy resin | 3.52 | | | 1.44 | | | 0.32 | | |

TABLE 2

Geometric features of the wrinkle defect-containing specimen

| Misplacement angle of the wrinkling fiber $\theta(°)$ | Height A (mm) | Width L (mm) | A/L |
|---|---|---|---|
| 39 | 1.8 | 4.5 | 0.4 |

The fatigue testing machine is a hydraulic electromagnetic servo fatigue machine (MTS 810). The tensile property of the specimen is tested first, where a displacement rate is 2 mm/min. The test is performed till the specimen is ruptured, and it is determined that the UTS and the ultimate tensile strain of the specimen are respectively 0.92 GPa and 0.1625 mm. The specimen is then subjected to a constant tensile loading amplitude sinusoidal wave form with a frequency of 10 Hz and a stress ratio of 0.1. In the embodiment, the applied maximum loading stress varies between 20% and 90% of the UTS at an interval of 5%. For each maximum loading stress, the specimen is only tested within 8,000 loading cycles, it is not necessary to perform the fatigue test on the specimen till the failure of the specimen, and the relation curve between the maximum loading stress $\sigma_{max}$ and the stable intrinsic dissipated energy $d_{istab}$ may be obtained. During the test, the infrared thermal imager is used to monitor and record the temperature on the surface of the specimen and is 400 mm away from the surface of the specimen. Meanwhile, strain gauges adhered on two ends of the specimen are used to measure a strain in the loading direction of the specimen to obtain the residual stiffness.

Figure 2:
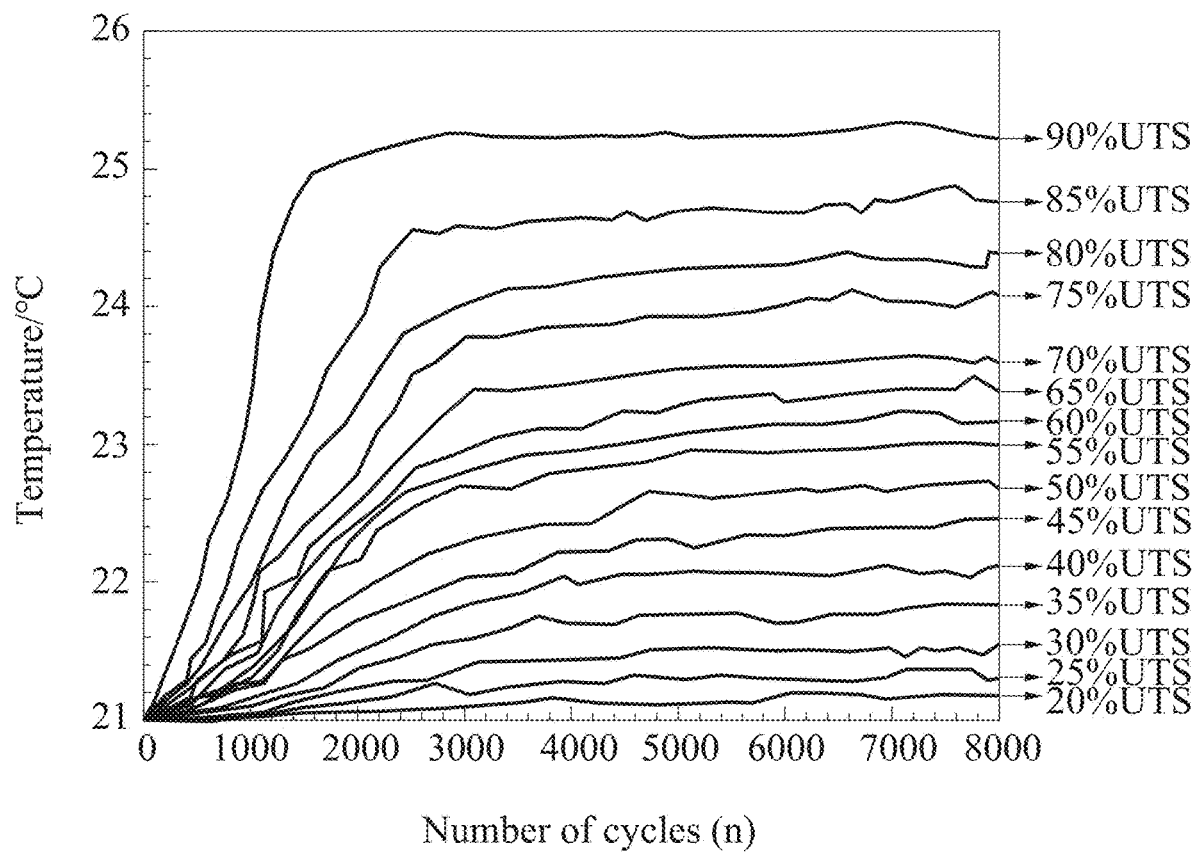
FIG. 2 shows a surface temperature change curve according to an embodiment of the present disclosure.

Under different maximum loading stresses, the average temperature change on the surface of the specimen recorded by the infrared thermal imager is shown in FIG. 2. The stable surface temperature data T of the specimen in the II stage under each stress is put into following intrinsic dissipated energy calculation expression:

$$d_{istab} = -\text{div}(k \text{grad} T) \quad (1)$$

where, k is a thermal conductivity, and k=1.5 W/(m·k). A relationship between the maximum loading stress $\sigma_{max}$ and the intrinsic dissipated energy $d_{istab}$ is obtained through the calculation of Equation (1), as shown in FIG. 3.

Figure 3:
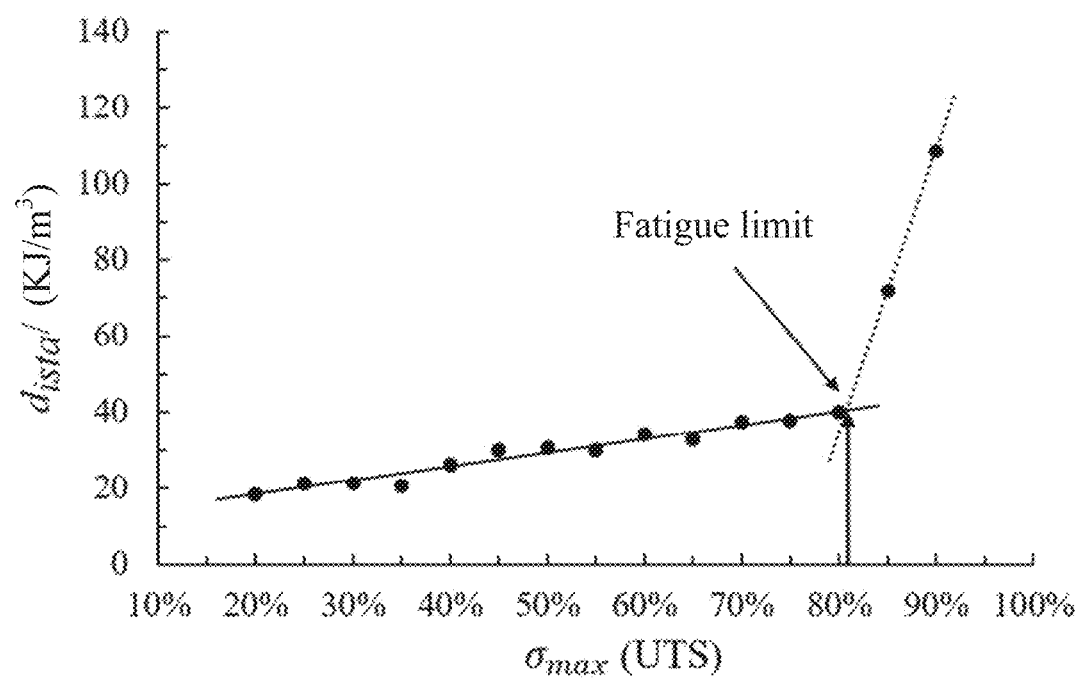
FIG. 3 shows a relational graph between a maximum loading stress $\sigma_{max}$ and intrinsic dissipated energy $d_{istab}$ according to an embodiment of the present disclosure.

FIG. 3 shows that the data has linear trends with two different slopes. Through linear fitting with a least square method, two straight lines below and above the fatigue limit are determined. The horizontal coordinate of a data intersection of the two linear regression lines corresponds to the fatigue limit of the specimen. According to FIG. 3, the fatigue limit of the specimen may be determined as 80.8% of UTS.

In the present disclosure, the load above the fatigue limit is considered as the overloaded area, namely, the area where the failure of the specimen occurs, there is no failure of the specimen when the load is below the fatigue limit, and thus the prediction is only performed to the fatigue life in the failure area. The method for determining the fatigue limit in the present disclosure only needs to acquire the average stable temperature rise of the specimen within 8,000 cycles under different loading stresses, which overcomes the limitation that the conventional fatigue method require a number of specimens and long test time.

A relational expression between the normalized residual stiffness in the fatigue-loading direction and the number of cycles is established as:

$$E'(n) = \frac{1}{a(A/L)^b + 1}(1 - pd_{istab}n^{1/q}) \quad (2)$$

Figure 4:
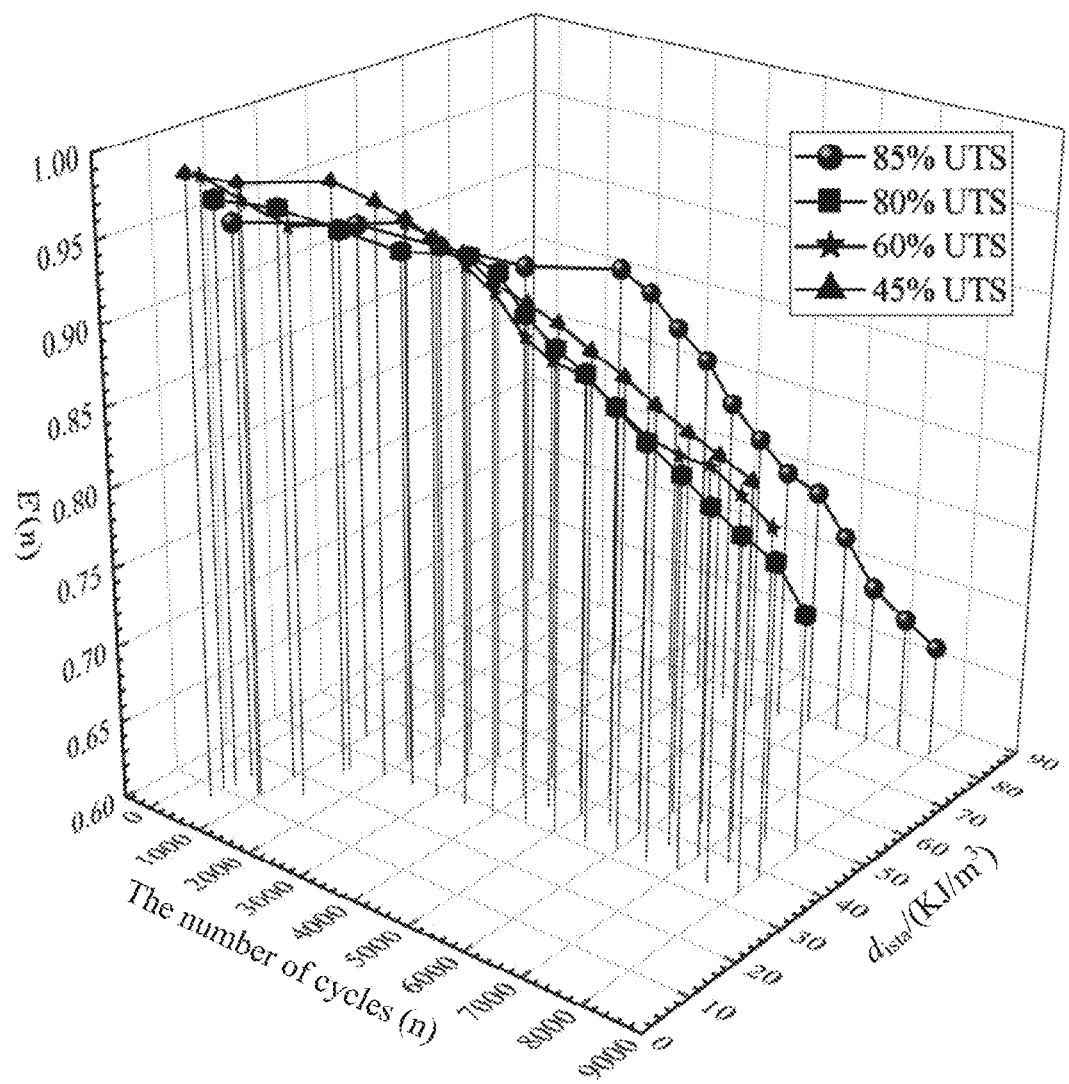
FIG. 4 shows a three-dimensional (3D) data graph among the number n of cycles, a normalized residual stiffness $E'(n)$ and the intrinsic dissipated energy $d_{istab}$ according to an embodiment of the present disclosure.

The geometric parameter A/L=0.4 of the specimen and the $d_{istab}$ and E'(n) data under different numbers n of cycles in FIG. 4 are put into Equation (2) to obtain parameter values of a, b, p and q. Four unknown parameter values, specifically a=−5.31034, b=5.09028, p=0.00336 and q=−2.18267E17, may be obtained. The determined parameter values are put into Equation (2). Owing to the number n=$10^6$ of cycles to failure corresponding to the fatigue limit, $d_{istab}$=41.3 kJ/m³. According to Equation (2), the normalized stiffness E'$_f$=0.624 in the failure of the specimen is obtained.

The fatigue life prediction model has the following expression:

$$N_f = \left\{ \frac{1 - [a(A/L)^b + 1](1 - E'_f)}{pd_{istab}} \right\}^q \quad (3)$$

Figure 5:
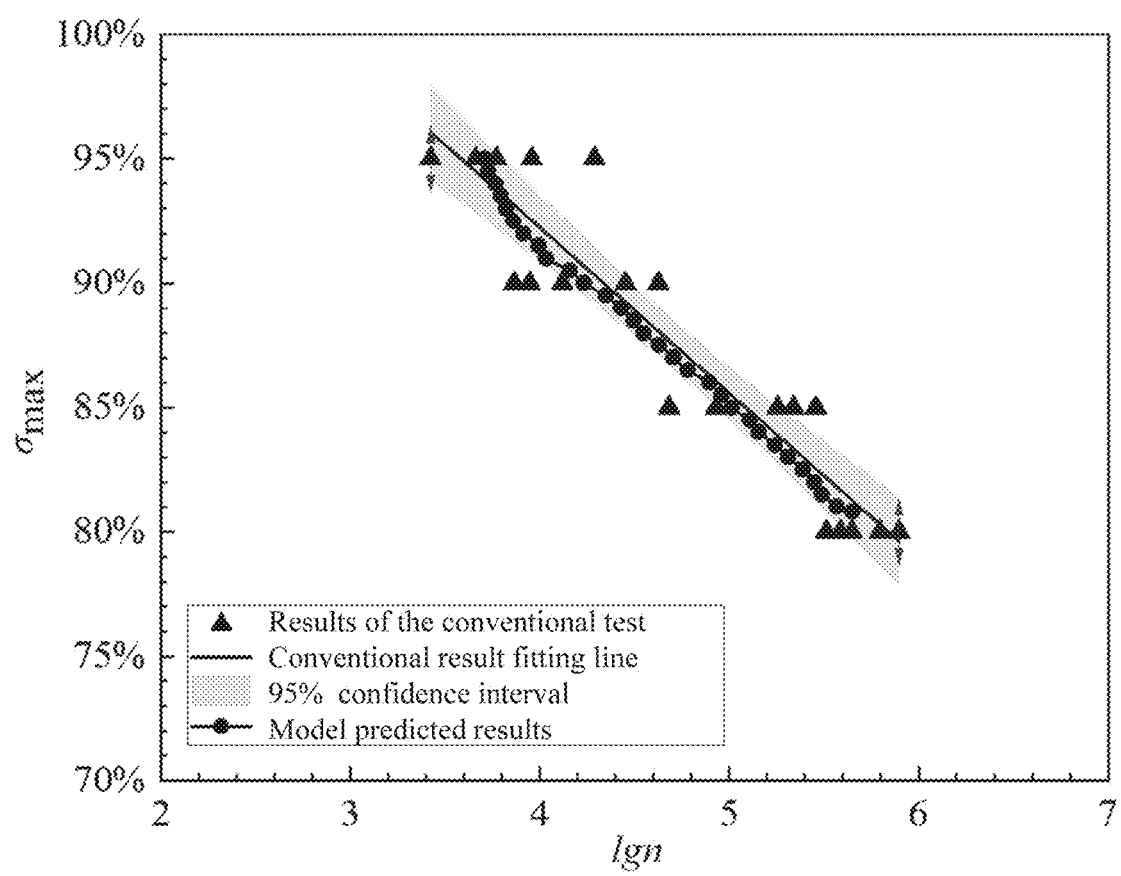
FIG. 5 shows a result of a predicted S-N curve of a fatigue test and a fatigue life result of a conventional test according to an embodiment of the present disclosure.

After a, b, p, q and E'$_f$ are known, the $d_{istab}$ under different stresses may be put into Equation (3) to predict a whole S-N curve of the specimen. The S-N curve predicted in the fatigue test in the embodiment of the present disclosure is shown in FIG. 5.

The S-N curve of the specimen may be predicted with the proposed life prediction model, and may also be obtained with a conventional fatigue test. In the embodiment, the conventional fatigue test is also performed on the specimen by respectively applying five maximum stresses, namely 95%, 90%, 85%, 80% and 75% of the UTS, to load each maximum stress under the control of the load till the failure of the specimen or an end of $10^6$ cycles. FIG. 5 shows the result of the conventional fatigue test of the specimen. The predicted S-N curve fits well with the life results of the conventional test; and the predicted life results are within a 95% confidence interval of the conventional results, and comply with the general authentication rule of the wind turbine blade. The S-N curve predicted under the $10^6$ cycles to failure in the present disclosure is not overestimated, and predicted results are basically less than the conventional test results, which is relatively conservative and meets the safety considerations in actual engineering.

It should be noted that the above specific descriptions on the present disclosure are merely for illustrating the present disclosure and are not limited to the technical solutions described in the embodiments of the present disclosure. A person of ordinary skill in the art should understand that the technical solutions of the present disclosure may be modified or equivalently replaced to achieve the same technical effects. These modifications or equivalent replacements shall all fall within the protection scope of the present disclosure as long as meeting the use requirements.

What is claimed is:

1. A method for quickly predicting a fatigue life of a wrinkle defect-containing main spar in a wind turbine blade, comprising:
    step S1: testing, on a universal fatigue testing machine, a tensile property of a wrinkle defect-containing specimen of material identical to a material of the main spar to be tested, to obtain an ultimate tensile strength (UTS); and synchronously monitoring and recording a temperature change on a surface of the specimen with an infrared thermal imager during a fatigue test, and counting and recording surface temperature, stress, strain and stiffness data of the specimen under different numbers of cycles upon completion of the test;
    step S2: calculating, according to the surface temperature data of the specimen obtained in step S1, intrinsic dissipated energy of the specimen under different loading stresses in a temperature stabilizing stage;
    step S3: plotting a relational graph between intrinsic dissipated energy $d_{ista}$ of the specimen and a corresponding UTS level, performing interpolation with a two curve method on data trendlines having two different slopes in the relational graph, and determining a fatigue limit of the specimen according to a $\sigma_{max}$ coordinate value of an intersection of the data trendlines, wherein an area with a load above the fatigue limit is considered as an overloaded area, which is an area where a failure of the specimen occurs; and there is no failure of the specimen in an area with a load below the fatigue limit during the test;
    step S4: establishing, based on a change of intrinsic dissipated energy in a fatigue process, a normalized residual stiffness model containing parameters to be determined, and putting fatigue test data recorded in steps S1 and S2 into the model to determine values of unknown parameters a, b, p and q in the model, wherein a and b are parameters related to a wrinkle defect in a material; and p and q are two material parameters independent of the intrinsic dissipated energy and a loading cycle;
    step S5: deducing a fatigue life prediction model for the specimen according to the normalized residual stiffness model with the determined parameters; and
    step S6: defining a number of cycles under which the specimen sustains a maximum fatigue load to determine a normalized failure stiffness; and predicting, through the fatigue life prediction model with the determined normalized failure stiffness, the fatigue life of the specimen to be tested, in the overloaded area to obtain a predicted S-N curve of the wrinkle defect-containing specimen.

2. The method of claim 1, wherein in step S1, a maximum loading stress of the fatigue test is applied to the specimen at a step size of 5% in a range of 20%-90% of the UTS; and each time, the specimen is only tested within 8,000 loading cycles.

3. The method of claim 1, wherein the universal fatigue testing machine in step S1 is a MTS810 hydraulic electromagnetic servo fatigue machine; the tensile property is tested at a displacement rate of 2 mm/min; and the specimen is subjected to a constant tensile loading amplitude sinusoidal wave form with a frequency of 10 Hz and a stress ratio of 0.1.

4. The method of claim 1, wherein calculating the intrinsic dissipated energy of the specimen in the temperature stabilizing stage in step S2 comprises:
    ignoring, when a uniform uniaxial cyclic load is applied to the specimen, an internal coupling source between an internal variable and a temperature; and implementing a balance between heat loss and the intrinsic dissipated energy when each cycle of the specimen is ended in the temperature stabilizing stage of the fatigue process, and expressing a model for calculating a stable intrinsic dissipated energy in the stage as:

$$d_{istab} = -\text{div}(k\text{grad}T_{stab}) \quad (1)$$

wherein, $T_{stab}$ is a temperature of the specimen in a surface temperature stabilizing stage in units of °C., k is a thermal conductivity in units of W/(m·K), and div(kgradT$_{stab}$) is a heat loss rate arising from heat conduction.

5. The method of claim 1, wherein establishing the normalized residual stiffness model in step S4 comprises:
    step S41: expressing a fatigue damage indicator D(n) during the fatigue test with a residual stiffness under the fatigue load as:

$$D(n) = \frac{E_0 - E(n)}{E_0 - E_f} = \frac{1 - E'(n)}{1 - E'_f} \quad (2)$$

wherein, n is a number of cycles; E(n) is a stiffness corresponding to an nth cycle; $E_0$ is an initial effective stiffness along an x-axis direction; E'(n) is a normalized residual stiffness corresponding to the nth cycle, and is defined as $E(n)/E_0$; $E_f$ is a failure stiffness; and $E'_f$ is a normalized failure stiffness at a final cycle $N_f$, and is defined as $E_f/E_0$; and
    step S42: establishing a relational expression between a normalized residual stiffness E'(n) in a fatigue-loading x-axis direction and the number of cycles as follows by introducing an influence of a height-width ratio in the wrinkle defect, based on a fact that a certain relation is present between a stable intrinsic dissipated energy value $d_{istab}$ and a damage accumulation:

$$E'(n) = \frac{1}{a(A/L)^b + 1}(1 - pd_{istab}n^{1/q}) \quad (3)$$

wherein, A and L are respectively a height and a width of an out-of-plane wrinkle defect; a and b are the parameters related to the wrinkle defect in the material; p and q are two material parameters independent of the intrinsic dissipated energy and the loading cycle; the normalized residual stiffness E'(n) is dimensionless, p is denoted in units of $/(J \cdot m^{-3} \cdot s^{-1})^{-1}$ and a, b and q are defined as dimensionless parameters for keeping a dimension uniform; the parameters a and b are used to reflect an influence from a geometry of the wrinkle; the parameter q is used to control a shape of a function; and parameter p is used to regulate an influence of $d_{istab}$, considering that $d_{istab}$ in the fatigue process depends on a test material.

6. The method of claim 5, wherein establishing the fatigue life prediction model in step S5 comprises:

step S51: expressing, in combination with the equation (2) and the equation (3), the fatigue damage indicator as:

$$D(n) = \frac{1 \frac{1 - pd_{istab} n^{1/q}}{a(A/L)^b + 1}}{1 - E'_f} \tag{4}$$

step S52: implementing an effect that a damage accumulation indicator must be 1 in a case of the final cycle $N_f$ to failure, which is expressed as $D(N_f)=1$, and expressing the deduced fatigue life prediction model as:

$$N_f = \left\{ \frac{1 - [a(A/L)^b + 1](1 - E'_f)}{pd_{istab}} \right\}^q \tag{5}$$

7. The method of claim 1, wherein the main spar and the specimen are made of unidirectional glass fiber reinforced polymer (GFRP) material.

8. The method of claim 1, further comprising performing a conventional fatigue test and comparing the results to the fatigue life prediction model.

* * * * *